E. THOMPSON.
ICE CREAM FREEZER.
APPLICATION FILED NOV. 9, 1916.
1,232,122.
Patented July 3, 1917.
2 SHEETS—SHEET 1.
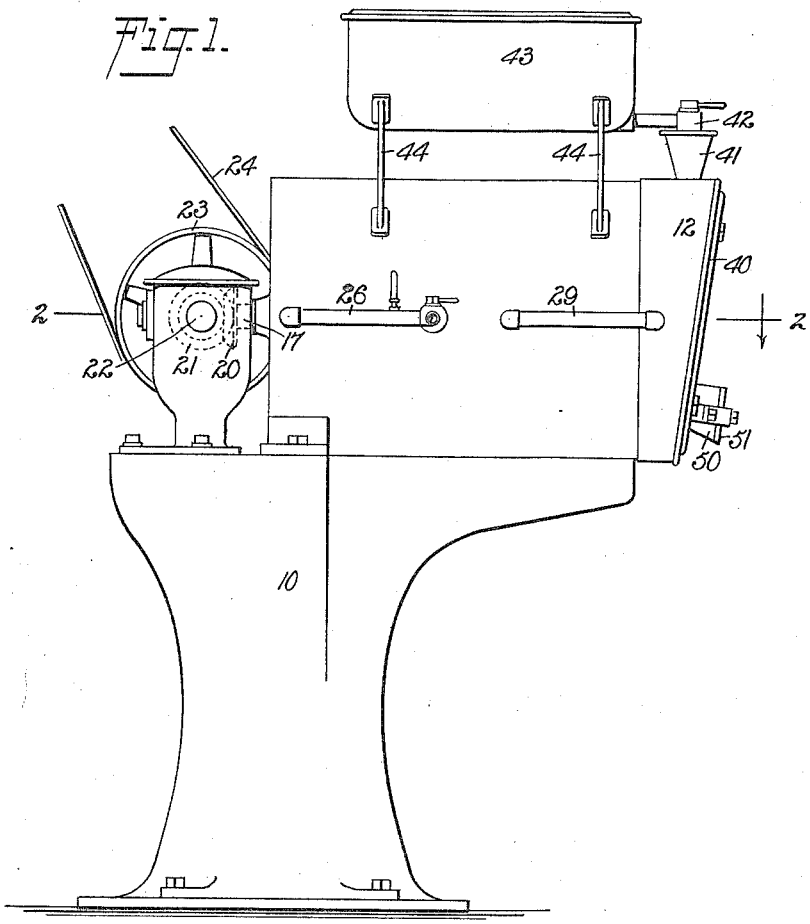
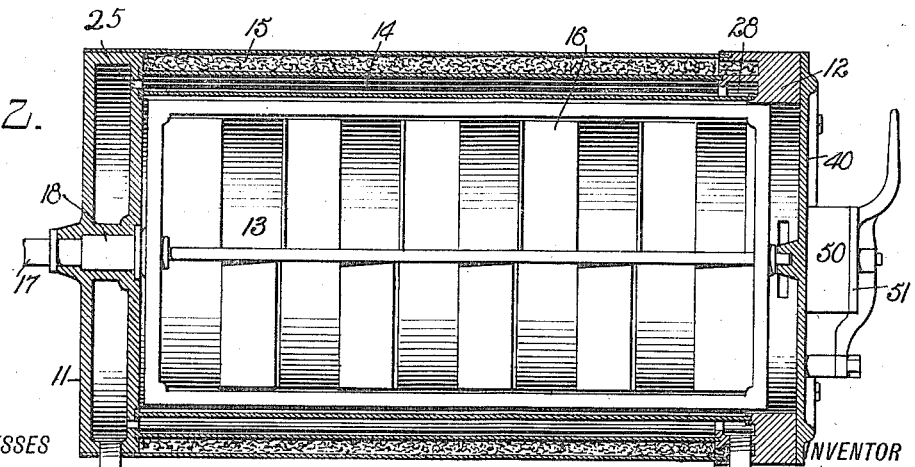

UNITED STATES PATENT OFFICE.

EMERY THOMPSON, OF NEW ROCHELLE, NEW YORK.

ICE-CREAM FREEZER.

1,232,122.  Specification of Letters Patent.  Patented July 3, 1917.

Application filed November 9, 1916. Serial No. 130,311.

*To all whom it may concern:*

Be it known that I, EMERY THOMPSON, a citizen of the United States, and a resident of New Rochelle, in the county of Westchester and State of New York, have invented a new and Improved Ice-Cream Freezer, of which the following is a full, clear, and exact description.

The invention relates to ice cream freezers such as shown and described in the Letters Patent of the United States, No. 1,081,790, granted to me on December 16, 1913.

The object of the present invention is to provide a new and improved ice cream freezer arranged to insure an effective action of the circulating freezing medium, and to avoid tapping of the shells for pipe connections and the like and thus maintaining the shells in unbroken continuity and preventing injury to the shells and leakage. Another object is to permit convenient and quick assembling of the parts and increase in the strength of the machine.

In order to accomplish the desired result, use is made of a vessel for containing the material to be frozen, a chamber surrounding the said vessel, a hollow head common to both the said vessel and the said chamber at one end thereof, the said head being in communication with the said chamber, a ring-shaped head closing the other end of the chamber and having its opening in register with this end of the vessel, a cover closing the said ring-shaped head, a filling device on the peripheral face of the said ring-shaped head for supplying the said vessel with the material to be frozen, and means for circulating a freezing medium through the said chamber by way of the said heads.

A practical embodiment of the invention is represented in the accompanying drawings forming a part of this specification, in which similar characters of reference indicate corresponding parts in all the views.

Figure 1 is a side elevation of the improved ice cream freezer;

Fig. 2 is a sectional plan view of the same on the line 2—2 of Fig. 1;

Figure 3:
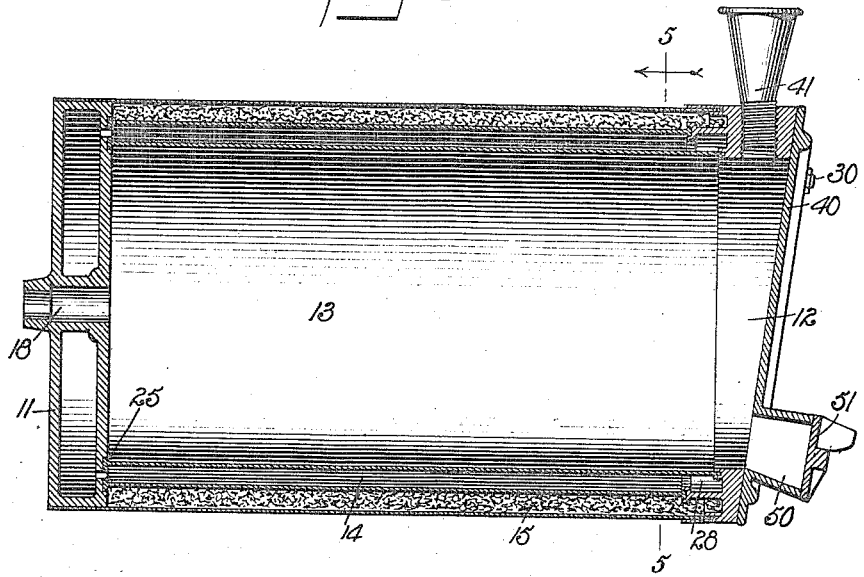
Fig. 3 is an enlarged sectional side elevation of the vessel, the chamber surrounding the vessel and the heads common to both the said vessel and the said chamber.
Figure 4:
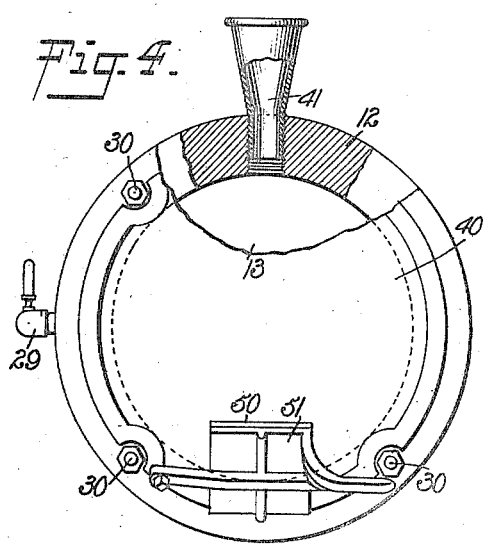
Fig. 4 is a front end elevation of the same with parts broken out.
Figure 5:
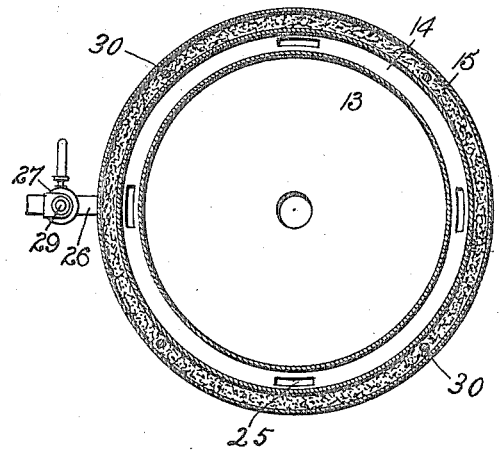
Fig. 5 is a cross section of the same on the line 5—5 of Fig. 3.

The improved ice cream freezer is mounted on a suitably constructed frame 10 which supports heads 11 and 12 on the ends of a vessel 13 and a chamber 14 surrounding the said vessel 13. The vessel 13 is adapted to receive the material to be frozen, and through the chamber 14 is circulated a freezing medium such as brine and the like. The shells of the vessel 13 and the chamber 14 are preferably made of thin sheet material, and the chamber 14 is provided with a heat insulating jacket 15 to keep the circulating freezing medium at as low a temperature as possible during its passage through the chamber 14.

Within the vessel 13 is mounted to turn an agitator 16 having its shaft 17 journaled in a bearing 18 formed centrally in the head 11, and on the outer end of the shaft 17 is secured a bevel gear wheel 20 in mesh with a bevel gear wheel 21 secured on a driving shaft 22 journaled in suitable bearings on the frame 10. The driving shaft 22 is connected by suitable mechanism such as pulleys 23 and belt 24 with the other machinery for imparting a rotary motion to the driving shaft 22, which latter rotates the shaft 17 and consequently the agitator 16.

The head 11 is made hollow and is in communication with the corresponding end of the chamber 14 by ports 25 formed in the inner wall of the head 11, as plainly shown in Fig. 3. The hollow head 11 is supplied with a freezing medium through a pipe 26 having a valve 27 and connected with a pump or other means for circulating the freezing medium through the head 11 and the chamber 14, the freezing medium passing from the latter into an annular recess 28 formed in the inner face of the head 12. This annular recess 28 is connected with a pipe 29 for returning the freezing medium to the original supply.

It will be noticed that by the arrangement described the freezing medium is circulated through the chamber 14 and the heads 11 and 12 to insure the proper freezing of the cream or other material contained in the vessel 13.

It will also be noticed that by the arrangement described the pipes 26 and 29 are tapped into the heads 11 and 12 and not through the thin walls or shells of the vessel 13, the chamber 14 and the jacket 15, thus leaving the said walls completely undisturbed and of unbroken continuity thereby preventing injury to the said shells and also preventing leakage.

In practice the heads 11 and 12 are fastened in position on the ends of the vessel 13 and the chamber 14 by stay bolts 30 extending through the jacket 15, and the said heads 11 and 12, as will be readily understood by reference to the drawings.

The head 12 is made ring-shaped and its outer face is beveled in a downward and inward direction thus providing a comparatively wide top and a narrow bottom. The outer face of the head 12 is closed by a cover 40 held in place by the stay bolts 30. In the top of the head 12 is screwed or otherwise fastened an inlet 41, preferably terminating at its outer end in a funnel into which discharges a valved spout 42 arranged on the under side of the pan 43 adapted to contain the cream or other material to be frozen. The pan 43 is shown mounted on brackets 44 held on top of the shell of the jacket 15. The lower end of the cover 40 is provided with an outlet 50 normally closed by a manually controlled valve or door 51 to permit of opening the outlet 50 whenever it is desired to discharge the frozen material from the vessel 13 after the filling operation is completed. It will be noticed that by beveling the head 12 in the manner described sufficient room is provided at the top for the attachment of a large filling device 41 and at the bottom of the head 12 the space between the end of the vessel 13 and the outlet 50 is reduced to a minimum to allow a ready passage of the ice cream from the vessel 13 to and through the outlet 50 at the time the valve 51 thereof is open.

When using the ice cream freezer the vessel 13 is charged with cream or other material to be frozen by opening the valved outlet 42 of the pan 43 containing said material, and which latter flows through the inlet 41 into the vessel 13. At the same time a freezing medium is circulated through the chamber 14, as previously stated and the agitator 16 is rotated so that the material contained in the vessel 13 is unobstructed with a view to insure quick freezing through the action of the freezing medium circulating through the chamber 14 and the heads 11 and 12. When the material is frozen the valve 51 is opened to allow discharge of the frozen material from the vessel 13.

It is understood that by the arrangement described the several parts of the machine can be readily assembled without requiring weakening of the walls or shells of the vessel 13, the chamber 14 and the jacket 15, as the connections for the inlet and the outlet of the material to be frozen and the frozen material are at the head 12 and the connections for circulating the freezing medium are common to both heads 11 and 12.

Having thus described my invention, I claim as new and desire to secure by Letters Patent:—

1. In an ice cream freezer, a freezer body, comprising two heads, one being hollow and having an inlet, and the other ring-shaped and having an annular recess in its inner end and a peripheral filling opening and a peripheral outlet leading from the recess, a cover secured to the outer end of the ring-shaped head and provided with a valve controlled discharge opening, and three concentric and spaced shells between the heads, the space between the innermost shell and the adjacent one communicating with the hollow head and the recess of the ring-shaped head and through which the refrigerating liquid flows from said hollow head to the recess of the ring-shaped head.

2. In an ice cream freezer, a freezer body, comprising two heads, one being hollow and having an inlet and the other ring-shaped and having its outer face beveled downwardly and inwardly, said ring-shaped head having a peripheral filling opening in its wider top portion, an annular recess in its inner end and a peripheral outlet leading from the recess, a cover on the outer face of the ring-shaped head and having a valve controlled discharge opening at its lower end, and three concentric and spaced shells between the heads, the space between the innermost shell and the adjacent one communicating with the hollow head and the recess of the ring-shaped head and through which the refrigerating liquid flows from the hollow head to the recess of the ring-shaped head.

3. In an ice cream freezer, a vessel adapted to contain the material to be frozen, a chamber surrounding the said vessel, heads common to both the said vessel and the said chamber, both heads being connected with the interior of the said chamber, circulating pipes connected with the said heads to circulate a freezing medium through the said heads, one of the heads being hollow and the other head being ring-shaped and having its opening in register with the corresponding end of the said vessel, the outer face of the ring-shaped head being beveled downwardly and inwardly, a filling device attached to the wider portion of said ring-shaped head to charge the vessel with the material to be frozen, and a cover closing the said ring-shaped head, and having a valve-controlled outlet for the frozen material.

EMERY THOMPSON.